Patented Sept. 11, 1928.

1,684,142

UNITED STATES PATENT OFFICE.

GRIGORI PETROFF, OF MOSCOW, RUSSIA, AND PETER SHESTAKOFF, OF PARIS, FRANCE.

PROCESS OF PREPARING PHENOL-FORMALDEHYDE CONDENSATION PRODUCTS.

No Drawing.   Application filed December 30, 1925.   Serial No. 78,485.

This invention relates to the production of fluent or hard resinous products by the condensation of phenols and aldehydes in the presence of powdered metals such as lead or zinc. These metals, in powdered condition, are added to a mixture of phenol or cresol and formaldehyde. Due to the catalytic action of the metals, reaction occurs at a temperature below 100° C. which results in the initial fluent condensation product. This fluent condensation product, unlike the initial condensation products obtained in other ways, possesses a considerably lighter color and has the property of being soluble not only in alcohol and acetone but also in benzene and other organic solvents which are not miscible with water.

This fluent condensation product is converted, after the elimination of water, into the final, hard, infusible, insoluble product by heating in the presence of catalytically acting aromatic sulfonic acids, for instance, benzene sulfonic acid, naphthalene sulfonic acid and the like. Before adding these acids to the initial fluent condensation product, they are dissolved in inert organic solvents in the nature of chlorine derivatives of hydrocarbons, for instance, trichlorethylene, carbon tetrachloride and the like, or in fats or fatty acids.

*Example 1.*—100 parts of cresylic acid (90–100%) or commercial carbolic acid, 100 parts of 36% formaldehyde solution, 10 parts of pulverized lead are mixed and heated in a closed vessel up to 75°–85° C. for 10 to 15 hours. The mixture is allowed to stratify and the upper water layer separated from the lower oily layer. The lower oily layer is heated in a vacuum in order to completely evaporate any water remaining in the oily material. As an alternative way of removing the water, the oily layer may be dissolved in a suitable solvent which is not miscible with water, for instance, benzene. To the so prepared solution, a neutral hydroscopic material is added and after all the water has been taken up by the hydroscopic material, the solvent is expelled. On heating the dried oily material, it changes into a hard resin soluble in alcohol and acetone. The hard resinous product may be employed to make lacquers, To change the dried initial fluent condensation product into a hard, insoluble, plastic mass, it is mixed with two parts of α or β naphthalene sulfonic acid dissolved in a mixture of 10 parts of trichlorethylene containing 10 parts of fatty acids derived from castor oil. The resulting mass is poured into molds and on heating a hard, infusible product is obtained.

*Example 2.*—100 parts of cresylic acids and 90 parts of 40% solution of formaldehyde are mixed with 5 parts of zinc powder and heated in a vessel with a reflux condenser for 10–15 hours. The upper water layer is then separated and the lower fluent oily condensation product is freed of water as described in Example 1. To convert the fluent product into a hard insoluble mass, it is mixed with two parts by weight of benzene sulfonic acid dissolved in 20 parts of fatty acids derived from rape seed oil, or the fluent mass may be mixed with 22 parts of a 10 to 11 per cent solution of sulfonic acid in such fatty acids. The resulting mass is poured into molds and heated until the hardening is complete.

The above described method makes it possible to easily regulate the condensation reaction and to obtain a product having good plastic properties suitable for the production of insulating material and other uses.

What we claim is:

1. In the process of preparing condensation products of phenols with formaldehyde, the step which comprises carrying out the process in the presence of powdered metals.

2. In the process of preparing condensation products of phenols with formaldehyde, the step which comprises carrying out the condensation in the presence of powdered lead.

3. The process of preparing hard and insoluble condensation products of phenols with formaldehyde which comprises condensing phenols with formaldehyde in the presence of powdered metals and thereafter heating the so obtained oily fluent condensation product in the presence of an aromatic sulfonic acid dissolved in a mixture of chlorhydrocarbons and fatty acids.

4. The process as in claim 3 in which the powdered metal is lead.

5. The process of preparing hard insoluble condensation products of phenols with formaldehyde which comprises condensing phenols with formaldehyde in the presence of a powdered metal and thereafter heating the so obtained oily fluent condensation product in the presence of aromatic sulfonic acids dissolved in an inert organic solvent.

6. The process as in claim 5 in which the powdered metal is lead.

In testimony whereof we affix our signatures.

GRIGORI PETROFF.
PETER SHESTAKOFF.